H. H. WHITE.
WIND SHIELD FOR AUTOMOBILES.
APPLICATION FILED JAN. 9, 1907.
909,266.
Patented Jan. 12, 1909.
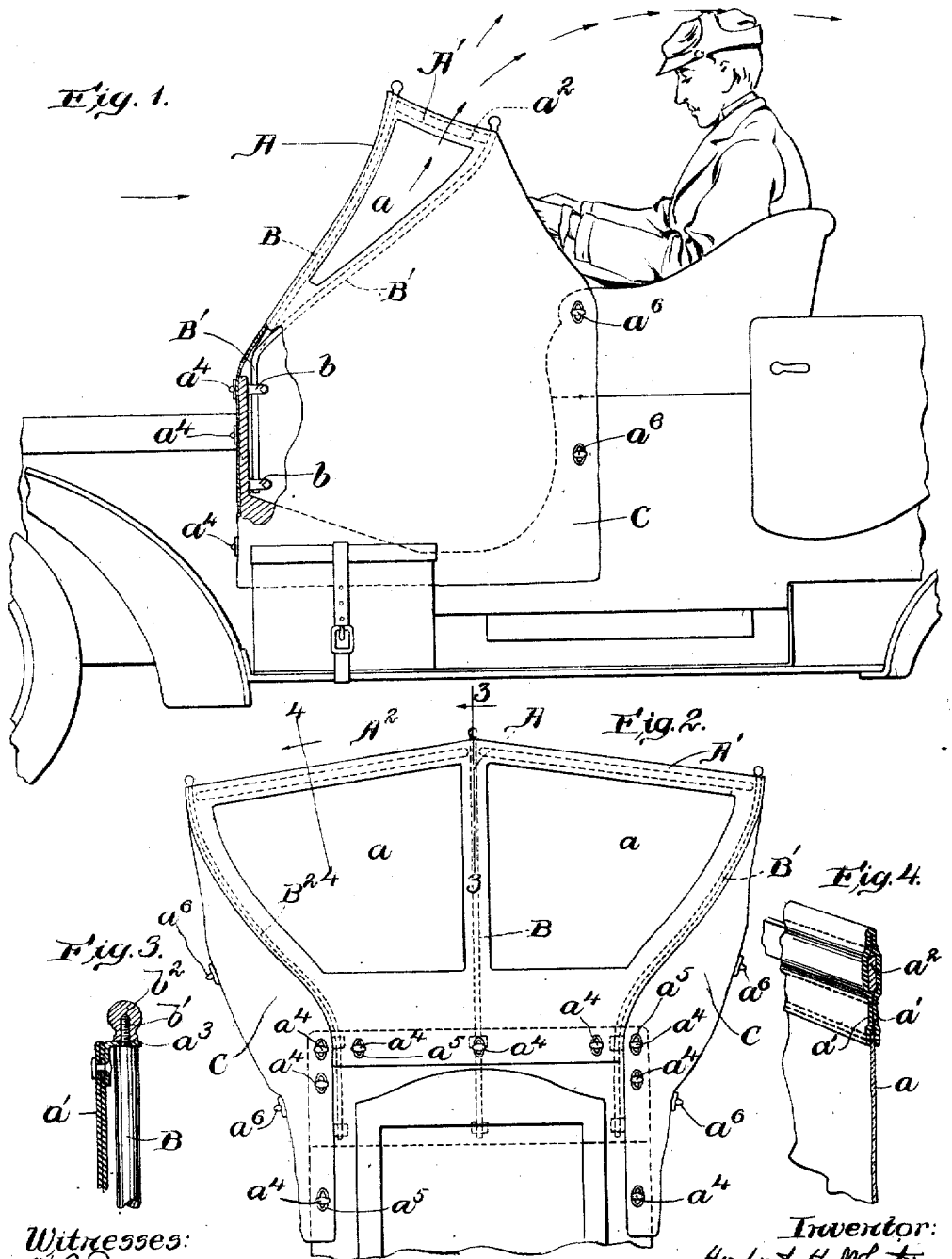

UNITED STATES PATENT OFFICE.

HERBERT H. WHITE, OF BROOKLINE, MASSACHUSETTS.

WIND-SHIELD FOR AUTOMOBILES.

No. 909,206.

Specification of Letters Patent.

Patented Jan. 12, 1909.

Application filed January 9, 1907. Serial No. 351,425.

*To all whom it may concern:*

Be it known that I, HERBERT H. WHITE, citizen of the United States, and resident of Brookline, Massachusetts, Norfolk county, have invented certain new and useful Improvements in Wind-Shields for Automobiles, of which the following is a specification.

The invention relates to wind shields adapted for use upon automobiles, and its object is to provide a shield which, while occupying a position below the line of vision, will effectively protect the driver and other occupant of the seat directly back of the shield without obstructing the view of the road over which the machine is being driven.

In accordance with one feature of the invention, the driver and the occupant of the seat with him are protected from the wind, dust, snow or rain by a shield arranged in an inclined position below the line of vision, and provided with deflecting surfaces sloping rearwardly from the center of the shield, and thus acting to deflect the currents of air striking the front of the machine upwardly and outwardly. The arrangement of the deflected surfaces of the shield in planes sloping rearwardly from the center of the shield, causes the air current passing up the shield to be spread outwardly as it flows upward over the rearwardly inclined surface of the shield. A strong upward current of air is thus produced which flows upwardly and rearwardly over the upper edge of the shield, and which also flows in an outwardly direction to some extent on opposite sides of the center line of the shield, thus strengthening the current passing over the upper edge of the shield at and near the outer sides of the shield where the current would otherwise be weak and comparatively ineffective. The air currents are therefore effectively deflected upward over the heads of the occupants of the car, who may be sitting on opposite sides of the center of the shield. This arrangement of the deflecting surfaces of the shield is not only important in securing an effective distribution of the air currents requisite for a protected area which will include the occupants of the seat back of the shield while the upper edge of the shield is below the line of vision, but in cases where the rearward slope from the center is carried to the upper edge of the shield is also of advantage in enabling the shield to be arranged at the requisite distance in front of the seat without unduly obstructing the space between the seat and the dashboard. In such case the center of the shield may be so arranged that the driver may stand in the space between the shield and seat back of this part of the shield, while the upper edge of the shield on opposite sides of the center may be nearer the seat and at the proper distance from the occupant to effectively protect him, while allowing an unobstructed view of the road over the top of the shield. This construction also enables the occupant of the seat back of the shield to bring his head nearer to or further away from the edge of the shield so as to secure the best protection under the existing conditions as to speed, etc., by moving sidewise, and thus retaining a comfortable position.

Further features of the invention relate to means for so supporting the shield in an inclined position extending from the top of the dashboard to a plane directly below the line of vision of the occupants of the seat that the shield may be supported in a practical and satisfactory manner, without obstructing the ready ingress and egress of the passengers.

The invention accordingly contemplates the provision of devices for supporting the shield in an inclined position extending from the top of the dashboard to a plane directly below the line of vision of the occupants of the seat which are secured to the body of the car in front of the seat and below the plane of the shield. With this construction and arrangement, the supporting devices are located intermediate the seat and the dashboard, and an unobstructed space is left at the sides between the upper part of the shield and the seat, while the shield is supported by devices which are located where they do not interfere with the convenience or comfort of the user of the car, or present an unsightly appearance, and where they will effectively resist the pressure of the air against the deflecting surfaces of the shield.

The specific form and construction of the supporting devices is not material to this feature of the invention in its broader aspects, and may be varied as found desirable, and in accordance with varying conditions prevailing in different cars to which the shield may be applied.

Further protection of the occupants of the seat back of the shield is preferably secured by providing side curtains which extend rearwardly from the sides of the shield and are connected with the sides of the car so that the space between the seat and the shield and dashboard is inclosed and protected at the sides as well as at the front.

The invention will be understood from an inspection of the accompanying drawings, in which—

Figure 1 is a side view showing a shield embodying all the features of the invention in their preferred forms, and so much of an automobile as is necessary to show the application of the shield thereto; Fig. 2 is a front view of the parts shown in Fig. 1; Fig. 3 is a sectional detail on line 3—3, Fig. 2; and Fig. 4 is a sectional detail on line 4—4, Fig. 2.

As shown in the drawings, the shield A is arranged in an inclined position and extends rearwardly over the dashboard in front of the front seat of the car. The shield is preferably made of some flexible material, such as leather, canvas or the like, and is supported in position over the dashboard of the car by three rods B, B' and B². The supporting rods are connected with the dashboard of the car by means of clamps $b$ which may be of any suitable construction, and may be secured or formed on the dashboard or other part of the car in any suitable manner. By means of these clamps the rods may be adjusted to vary the height of the shield or to put the desired tension upon the material of which the shield is formed. Those parts of the rods which extend above the dashboard are inclined rearwardly from the vertical, so that the shield occupies an inclined position over the space between the dashboard and the front seat of the car. The outer rods B', B² which lie along the outer edges of the shield are inclined to a greater extent than the center rod B, so that the shield is provided with wind deflecting surfaces A', A² which slope rearwardly from the center of the shield the rearward slope extending to the upper edge of the shield. The shield is also preferably shaped so that the upper edge of the shield slopes downwardly from the center. The upper edge of the shield is thus lower at its outer edges than it is at the center, and is nearer to the seat.

When a car provided with a shield such as above described is being driven into a wind, or at a rapid rate, the air striking against the inclined, rearwardly sloping surfaces of the shield, is deflected upwardly and outwardly from the center of the shield. As this air passes in an upward and rearward direction it encounters the air which would otherwise pass directly over the top of the shield and carries this air upward with it, the resulting current being in an upwardly and rearwardly direction, as indicated by the arrows in Fig. 1. The currents on opposite sides of the center of the shield will also be directed outwardly by reason of the rearward slope of the surfaces A', A², thus increasing the strength of the currents which pass up near the outer side of the shield. By reason of this action of the shield upon the air, the upper edge of the shield may be arranged below the line of vision, and a sufficiently broad range of protected area be provided directly back of the shield to fully protect the occupants of the seat in front of which the shield is arranged. The driver may therefore clearly see the road over which he is driving, and the shield will in no wise interfere with his view of the road even in weather or under conditions which would render the use of transparent shields arranged in the line of vision impracticable or dangerous.

The construction of the shield with the rearwardly slope of the surfaces A', A², extending to the upper edge of the shield, also enables the shield to be arranged with its upper edge comparatively close to the heads of the occupants of the seat back of the shield, and still leave sufficient space between the rear edge of the shield and the seat to enable the occupants of the car to stand in the space between the center of the shield and the seat when desirable. Since the upper edge of the shield in this construction approaches nearer the seat from the center outward, the head of the operator may be moved to bring it the desired and proper distance from the edge of the shield without the necessity of assuming an uncomfortable or strained position. The downward slope of the upper edge of the shield from the center outward also enables the occupant of the seat back of the shield to shift his head into different vertical positions and still secure effective protection and a full view of the road over the top of the shield.

In order to further protect the occupants of the seat back of the shield, the shield is provided with side curtains or flaps C which are connected with the sides of the shield and extend vertically across the space between the dashboard of the car and the seat. These side curtains may be provided with eyelets or grommets $a^5$ adapted to engage buttons $a^4$, $a^6$ on the front of the dashboard and sides of the seat respectively, and to thus secure the curtains firmly in position and still enable them to be readily detached and swung back when desired.

The shield may be and preferably is formed in part of a transparent material, such, for instance, as celluloid, so that the driver may look through the shield in case he wishes to see any of the parts on the hood of the machine. As shown in the drawings the shield is formed from two sheets $a$ of celluloid secured between strips or sheets $a'$ of leather, canvas or other suitable material. The upper edge of the shield is stiffened by strips $a^2$ secured between the layers of the strips or sheets A' as indicated in Fig. 4. As shown, the shield is secured to the upper ends of the rods by means of ears $a^3$ arranged to pass over pins $b'$ on the ends of the rods, and held on the ends of the rods by screw caps $b^2$. The lower edge of the shield is flexible and passes over the dashboard and is secured to the outer face of the dashboard by means of buttons $a^4$ arranged to pass through eyelets $a^5$ formed in the flexible lower edge of the shield.

While I prefer to construct and arrange the shield as shown in the drawings, it will be understood that the specific construction and arrangement of the parts shown and described are not essential to the broader features of the invention, although certain features which have been referred to, and which are specified in the claims, are of importance in securing the most advantageous results.

Having explained the nature and object of the invention, and specifically described one form of shield in which the invention may be embodied, what I claim is:—

1. A wind shield for automobiles provided with wind deflecting surfaces arranged to deflect the currents of air striking against them upward and outward over the upper edge of the shield, and means for supporting the shield in an inclined position over the space in front of the seat of an automobile and with its upper edge directly below the line of vision of the occupants, substantially as described.

2. A wind shield for automobiles provided with wind deflecting surfaces sloping rearwardly from the center of the shield, and means for securing the shield in a rearwardly inclined position in front of a seat of an automobile and below the line of vision of the occupants, substantially as described.

3. A wind shield for automobiles having a rearwardly inclined wind deflecting surface, and having its outer edges at a greater angle to the vertical than its center, and means for securing the shield over the space in front of the seat of an automobile and with its upper edge below the line of vision of the occupants, substantially as described.

4. A wind shield for automobiles comprising supporting rods, devices for securing the rods in position in front of the seat of an automobile, a shield supported on the rods in an inclined position in front of the seat, with its upper edge in a substantially horizontal plane directly below the line of vision of the occupants, and having its lower edge extending over and secured at the front of the dashboard, substantially as described.

5. A wind shield for automobiles comprising rearwardly inclined supporting rods, devices for securing the rods in position in front of the seat of an automobile, the outer rods being inclined to a greater extent than the center rod, a flexible shield stretched over said rods and presenting wind deflecting surfaces which slope rearwardly from the center to deflect the air upwardly and outwardly, substantially as described.

6. A wind shield for automobiles comprising a shield extending in a rearwardly inclined direction from the top of the dashboard, and with its upper edge in an approximately horizontal plane directly below the line of vision of the occupants of the seat, supporting rods having their lower ends secured to the body of the car in front of the seat and below the plane of the shield, and arranged to leave a clear space at the sides between the shield and seat, and side curtains connecting with the sides of the shield, and provided with means for securing them to the sides of the automobile, substantially as described.

7. A wind shield for automobiles comprising a shield extending in a rearwardly inclined direction from the top of the dashboard, and with its upper edge in an approximately horizontal plane directly below the line of vision of the occupants of the seat, and provided with wind deflecting surfaces arranged to deflect the wind upwardly and outwardly over the upper edge of the shield, substantially as described.

In witness whereof, I have hereunto set my hand, this 27th day of December 1906.

HERBERT H. WHITE.

In the presence of—
IRA L. FISH,
KATHARINE A. DUGAN.